United States Patent
Avula et al.

(10) Patent No.: US 9,548,596 B2
(45) Date of Patent: Jan. 17, 2017

(54) FLEXIBLE TEXTILE SLEEVE WITH END FRAY RESISTANT, PROTECTIVE COATING AND METHOD OF CONSTRUCTION THEREOF

(75) Inventors: Ramesh R. Avula, Phoenixville, PA (US); Geoffrey Gibbs, Jr., Charlotte, NC (US); John Barber, Jr., Paoll, PA (US)

(73) Assignee: Federal-Mogul Powertrain, Inc., Southfield, MI (US)

( * ) Notice: Subject to any disclaimer, the term of this patent is extended or adjusted under 35 U.S.C. 154(b) by 250 days.

(21) Appl. No.: 12/900,105

(22) Filed: Oct. 7, 2010

(65) Prior Publication Data

US 2011/0083879 A1 Apr. 14, 2011

Related U.S. Application Data

(60) Provisional application No. 61/249,326, filed on Oct. 7, 2009.

(51) Int. Cl.
*H01B 7/24* (2006.01)
*H02G 3/04* (2006.01)
*B60R 16/02* (2006.01)

(52) U.S. Cl.
CPC ......... *H02G 3/0481* (2013.01); *B60R 16/0215* (2013.01)

(58) Field of Classification Search
CPC ............. A44B 18/0011; A44B 18/0076; A47B 95/043; H02G 3/04; H02G 3/00; H02G 3/0481; H01B 5/102; H01B 5/107; H01B 5/00; H01B 5/104; H01B 5/12; H01B 12/00; H01B 12/02; H01B 12/04; H01B 12/06; H01B 12/08; H01B 12/10; H01B 12/12; H01B 12/14; H01B 12/16; H01B 3/47; H01B 3/48; D06M 11/78; D06M 11/79; D06M 13/50; D06M 13/503; D06M 13/507; D06M 13/51; D06M 13/513; D06M 13/5135; D06M 13/517; D06M 15/356; D06M 15/3568; D06M 15/643; D06M 15/6433; D06M 15/6436; D06M 15/647; D06M 15/65; B60R 16/0215

(Continued)

(56) References Cited

U.S. PATENT DOCUMENTS 3,149,019 A * 9/1964 Skotnicki et al. ............ 442/281
3,758,630 A * 9/1973 Bilow ............................ 525/416
3,769,253 A * 10/1973 Stevenson ..................... 524/588

(Continued)

FOREIGN PATENT DOCUMENTS

EP 0220804 A1 * 5/1987
EP 0333279 3/1989

(Continued)

*Primary Examiner* — Angel R Estrada
*Assistant Examiner* — Pete Lee
(74) *Attorney, Agent, or Firm* — Robert L. Stearns; Dickinson Wright, PLLC

(57) ABSTRACT

A textile sleeve for routing and protecting elongate members and method of construction thereof is provided. The textile sleeve has an elongate textile wall constructed from interlaced yarn. An emulsion of acrylic binder and water-based silicon resin is applied to coat the interlaced yarn, with the acrylic binder providing resistance to end fray of the textile sleeve at temperatures below 150° C., and the silicone resin providing resistance to end fray between about 150-500° C.

2 Claims, 2 Drawing Sheets

(58) Field of Classification Search
USPC ................ 174/136; 442/87; 428/99
See application file for complete search history.

(56) References Cited

U.S. PATENT DOCUMENTS

| | | | |
|---|---|---|---|
| 3,828,119 A * | 8/1974 | Warburton et al. | 174/121 A |
| 3,917,901 A * | 11/1975 | Jones | 174/110 P |
| 4,056,492 A * | 11/1977 | Merrill | 528/18 |
| 4,430,384 A | 2/1984 | George | |
| 4,525,502 A * | 6/1985 | Traver | 524/96 |
| 4,931,326 A | 6/1990 | Weil | |
| 5,008,495 A | 4/1991 | Mudgett | |
| 5,082,297 A | 1/1992 | Flasher | |
| 5,296,278 A | 3/1994 | Nishimura et al. | |
| 5,343,895 A | 9/1994 | King et al. | |
| 5,447,918 A | 9/1995 | McCullough | |
| 5,603,514 A | 2/1997 | Jencks et al. | |
| 5,804,624 A | 9/1998 | Wang | |
| 5,849,379 A | 12/1998 | Gladfelter et al. | |
| 5,886,216 A | 3/1999 | Pudas | |
| 5,976,997 A | 11/1999 | Meaney et al. | |
| 6,219,906 B1 | 4/2001 | Sosnowski | |
| 6,417,445 B1 * | 7/2002 | Sato | H01B 11/1808 174/28 |
| 7,423,095 B2 | 9/2008 | Gordon et al. | |
| 7,576,286 B2 * | 8/2009 | Chen | 174/117 M |
| 2002/0022422 A1 | 2/2002 | Waldrop, III et al. | |
| 2004/0140010 A1 | 7/2004 | Hasslberger et al. | |
| 2005/0124249 A1 * | 6/2005 | Uribarri | 442/304 |
| 2005/0227558 A1 * | 10/2005 | Small et al. | 442/136 |
| 2007/0166495 A1 | 7/2007 | Sellis | |
| 2007/0226971 A1 | 10/2007 | Tonooka et al. | |
| 2007/0243356 A1 | 10/2007 | Baer | |
| 2007/0251595 A1 | 11/2007 | Chen | |
| 2008/0075983 A1 | 3/2008 | Chen | |
| 2008/0124976 A1 * | 5/2008 | Rodrigues et al. | 439/610 |
| 2008/0135119 A1 | 6/2008 | Tonooka | |
| 2008/0169039 A1 * | 7/2008 | Vines | D03D 25/00 139/383 A |
| 2009/0093359 A1 * | 4/2009 | Seto et al. | 502/62 |
| 2009/0218002 A1 * | 9/2009 | Kashihara | D03D 1/0041 139/433 |
| 2010/0089515 A1 * | 4/2010 | Malloy et al. | 156/56 |

FOREIGN PATENT DOCUMENTS

| | | |
|---|---|---|
| JP | S59165648 A | 9/1984 |
| JP | H03146762 A | 6/1991 |
| JP | 2004156171 A | 6/2004 |
| JP | 2005530052 A | 10/2005 |
| JP | 2007525560 A | 9/2007 |
| JP | 2009535593 A | 10/2009 |
| JP | 2010512466 A | 4/2010 |
| WO | 9729316 | 2/1997 |
| WO | 2004055421 | 7/2004 |
| WO | 2005010078 A1 | 2/2005 |
| WO | 2005105429 | 11/2005 |
| WO | 2007047635 | 4/2007 |

* cited by examiner

FLEXIBLE TEXTILE SLEEVE WITH END FRAY RESISTANT, PROTECTIVE COATING AND METHOD OF CONSTRUCTION THEREOF

CROSS-REFERENCE TO RELATED APPLICATIONS

This application claims the benefit of U.S. Provisional Application Ser. No. 61/249,326, filed Oct. 7, 2009, which is incorporated herein by reference in its entirety.

BACKGROUND OF THE INVENTION

1. Technical Field

This invention relates generally to tubular sleeves for protecting elongate members, and more particularly to flexible textile sleeves.

2. Related Art

It is known to wrap wires and wire harnesses in protective textile sleeves to provide protection to the wires against abrasion, fluid and thermal effects. The textile sleeves are typically first woven, braided, or knit, and then subsequent to being formed, the textile material is cold cut to a desired length, whether in manufacture or in the field. Unfortunately, upon cold cutting the textile sleeve material to the desired length, the yarn or yarns used to construct the sleeve typically fray at the cut ends. Thus, the cut ends become unsightly, and further, tend to be a source of degradation, such as by unraveling.

In an effort to avoid the aforementioned unsightly, problematic cold cut phenomenon, it is known to coat the textile sleeves with a silicone rubber prior to the cutting operation, which allows the sleeve to remain flexible and to be cut with minimal end fray. However, the silicone rubber coating prevents the sleeve from being used in relatively high temperature applications, such as above 150 degrees Celsius (° C.). Thus, there remains a need for a textile sleeve that can be cold cut to length without concern of end fray, with the sleeve being useful at temperatures above 150° C.

SUMMARY OF THE INVENTION

One aspect of the invention provides a textile sleeve for routing and protecting elongate members. The textile sleeve has an elongate textile wall constructed from interlaced yarn. An acrylic binder and water-based silicon resin coating is applied to the interlaced yarn, with the acrylic binder providing resistance to end fray of the textile sleeve at temperatures below 150° C., and the silicone resin providing resistance to end fray between about 150-500° C.

In accordance with another aspect of the invention, a method of constructing a flexible textile sleeve is provided. The method includes interlacing one or more heat-formable yarns to form a textile fabric. The method further includes applying an emulsion of water-based silicon resin and acrylic binder to the textile fabric. Then, the method includes heating the coated emulsion at a temperature sufficient to drive off the water from the emulsion without curing the silicon resin. Further, the method includes heat forming the heat-formable yarns at a temperature that is sufficient to form a wall of the sleeve as a self-wrapping tubular wall curling about a longitudinal axis of the sleeve, wherein the temperature is insufficient to cause the silicon resin to cure.

Accordingly, the invention provides a textile sleeve that remains flexible while applying the textile sleeve about elongate members to be protected. Further, the textile sleeve can be cold cut without causing yarns of the textile sleeve to fray. Further yet, the sleeve can withstand temperatures above 150° C. without affecting the protective integrity of the sleeve. In addition, the acrylic binder can be driven off and the silicon resin can be cured at temperatures above about 200° C., with the presence cured silicon resin maintaining protective properties to the sleeve.

BRIEF DESCRIPTION OF THE DRAWINGS

These and other aspects, features and advantages will be readily apparent to those skilled in the art in view of the following detailed description of presently preferred embodiments and best mode, appended claims, and accompanying drawings, in which:

DETAILED DESCRIPTION OF PREFERRED EMBODIMENTS

Figure 1:
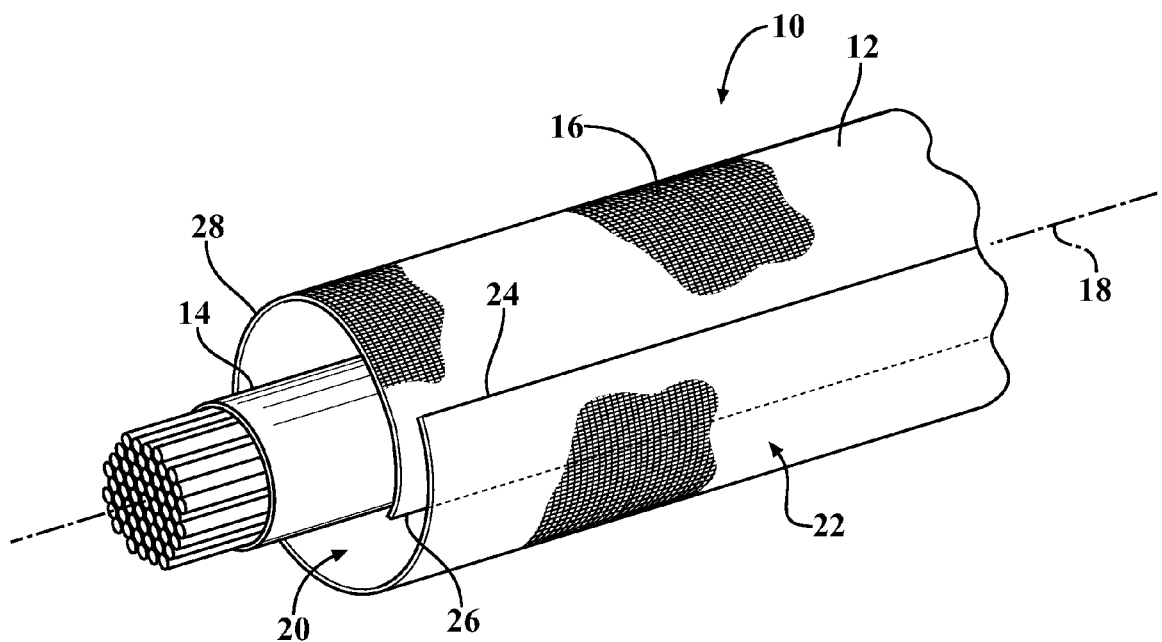
FIG. 1 is a schematic perspective partial view of a flexible, self-wrapping textile sleeve constructed in accordance with one aspect of the invention shown carrying and protecting elongate members therein.
Figure 2:
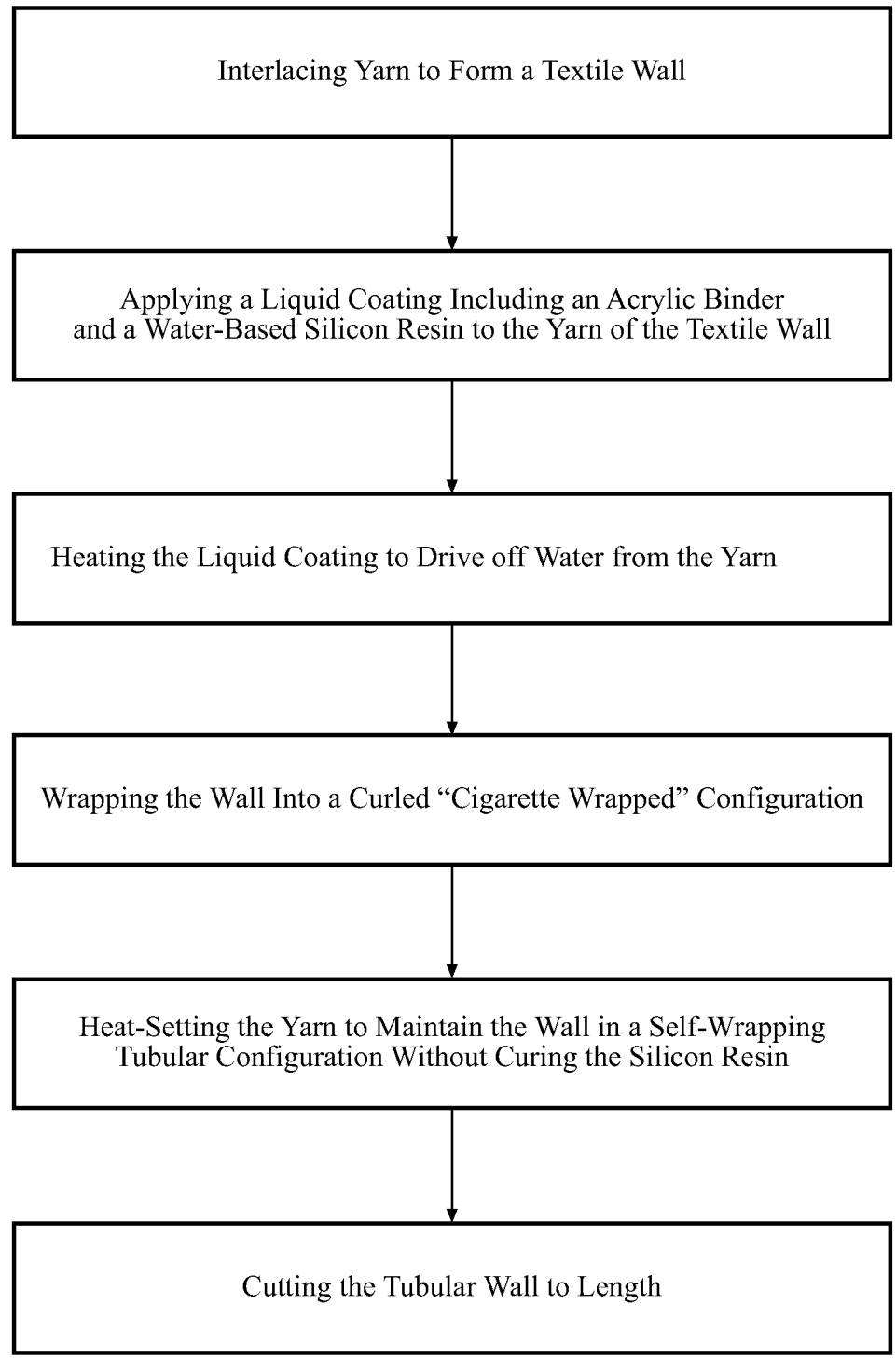
FIG. 2 is an exemplary series of steps used to construct a textile sleeve in accordance with one aspect of the invention.

Referring in more detail to the drawings, FIG. 1 illustrates a schematic view of self-wrapping textile sleeve, referred to hereafter as sleeve 10, constructed in accordance with one aspect of the invention. The sleeve 10 has a elongate wall 12, such as self-wrapping, for routing and protecting elongate members, such as wires or a wire harness 14, for example. The elongate wall 12 is constructed from at least one or more yarns 16, wherein the yarn or yarns are interlaced to form the wall 12. At least some of the yarns 16 in the self-wrapping embodiment are provided as heat-settable yarns, wherein the heat-settable yarns are heat-set subsequent to being interlaced to bias the wall 12 into a self-wrapping tubular configuration. Accordingly, the wall 12 is self-curled about a central longitudinal axis 18 to provide an enclosed or substantially enclosed tubular inner cavity 20 when the wall 12 is in its relaxed state without an external force acting to uncurl the wall 12 from its self-curled configuration. The cavity 20 is readily accessible along the longitudinal axis 18 of the sleeve 10 so that the elongate members 14 can be readily disposed radially into the cavity 20, and conversely, removed radially outwardly from the cavity 20, such as during service. To allow the wall 12 to be cold cut to length without concern of end fray of the yarns 16, the interlaced yarns 16 have a coating 22 of an emulsion applied thereto, with the emulsion including or consisting of an acrylic binder and water-based silicon resin. The finished coating 22 allows the sleeve 10 to remain flexible up to about 200-250° C., and allows the sleeve 10 to withstand an operating environment temperature up to about 500° C. without degrading. Accordingly, the sleeve 10 is useful in a wide variety of extreme temperature applications to protect the elongate members 14 therein, while at the same time being economical in manufacture and light weight relative to other high temperature, non-textile tubing, such as metal or plastic tubing.

The wall 12 can be constructed having any suitable size, including length, diameter and wall thickness. The wall 12 has opposite side edges, referred to hereafter as sides 24, 26, that extend parallel to the axis 18. The sides 24, 26 terminate at opposite ends 28, 29 that are cold cut to a desired length, such as during manufacture or in the field of application. When the wall 12 is in its self-wrapped tubular configuration, generally free from any externally applied forces, the sides 24, 26 preferably overlap one another at least slightly to fully enclose the cavity 20 circumferentially. Accordingly, the wall 12 of the sleeve 10 extends circumferentially about the wires 14 to provide full circumferential protection to the wires 14 contained in the cavity 20. The longitudinally extending sides 24, 26 of the sleeve 10 are readily extendable away from one another under an externally applied force to at least partially open and expose the cavity 20. As such, the wires 14 can be readily disposed radially into the cavity 20 during assembly or removed radially from the cavity 20 during service. Upon releasing the externally applied force from the sides 24, 26, the sides 24, 26 return automatically to their relaxed or substantially relaxed, overlapping self-wrapped position under the bias imparted from being heat-set.

The wall 12 can be constructed from multifilament and/or monofilament yarns 16, with at least one or more of the yarns 16 in the self-wrapping embodiment being heat-settable. For example, one or more of the yarns 16 can be provided as a heat-settable polymeric material, such as polyphenylene sulfide (PPS), for example, which can be heat-set at a temperature between about 200-225° C. The yarns 16 forming the wall 12 can be interlaced using a variety of interlacing processes, such as weaving, knitting, or braiding, as desired, shown schematically in FIG. 1 as being woven.

Upon forming the textile wall 12 with the interlaced yarns 16, whether using a braiding, knitting or weaving process, the emulsion is applied the yarns 16, whereupon the coating 22 is formed on the wall 12 and/or impregnated in the yarns 16. The coating 22 is initially applied on the yarns 16 as an emulsion liquid coating, such as by a spraying, brushing, dipping or roll coating process, for example. The coating 22 is provided as an emulsion of an acrylic binder, such as a carboxylated elastomeric emulsion having a content of about 15-18% by wt., for example, and a water-based silicon resin, such as a methyl phenyl polysiloxane emulsion of about 15-18% by wt, for example. Upon applying the emulsion to the yarns 16, the water in the emulsion is driven off, such as by application of heat, for example. The heat applied is sufficient to cause the water to be driven off and to provide the wall 12 with a substantially dry feel, however, the silicon resin remains uncured, as the heat is not sufficient to cause the silicon resin to cure. Accordingly, the wall 12 remains freely flexible in an uncured state.

Then, the wall 12 is wrapped into a tubular configuration, preferably with the opposite sides 24, 26 being overlapped relative to one another, and a sufficient heat, such as a temperature between about 200-225° C., is applied to the wall 12 to cause at least some of the heat-settable yarns 16 to be heat-shaped to cause the wall 12 to remain in the wrapped configuration. Accordingly, the wall 12 takes on its self-wrapping tubular form, though the heat applied does not cause the silicone resin to cure. As such, the wall 12 remains freely flexible and uncured so that it can be readily routed about sharp bends and corners in use. Further, with the coating 22 remaining uncured, and the wall 12 remaining flexible, the opposite sides 24, 26 can be readily separated via an externally applied force to allow the elongate members to be serviced, as necessary.

Then, upon forming the wall 16 in the desired configuration, the desired length is established by cold cutting at least one of the ends 28 without the yarns 16 becoming frayed. The lack of fraying is directly attributable to the coating 22 of acrylic binder and silicon resin.

In use, the sleeve 10 can withstand temperatures to between about 150-200° C. before the acrylic binder in the coating 22 is driven off, however, the silicon resin in the coating 22 remains on the sleeve wall 12, and may even cure at more elevated temperatures. If the silicon resin cures, the sleeve 10 remains operable to protect the elongate members therein up to temperatures of about 500° C., though it loses its flexibility if the silicon becomes cured. Accordingly, the sleeve 10 is useful over a wide range of temperatures to protect the elongate members 14 therein without having adverse affects on the elongate members 14 or surrounding surfaces, such as can be the case with sleeves having rubber-based coatings that melt.

Obviously, many modifications and variations of the present invention are possible in light of the above teachings. It is, therefore, to be understood that within the scope of the appended claims, the invention may be practiced otherwise than as specifically described.

What is claimed is:

1. A tubular textile sleeve for routing and protecting elongate members, comprising:
   a wall having opposite side edges extending generally parallel to a central longitudinal axis of said sleeve, said wall being constructed from interlaced yarn that is heat-set to bias said wall into a self-wrapping tubular configuration with said opposite side edges being in overlapped relation with one another; and
   a liquid coating applied to said interlaced yarn and dried, said coating having an acrylic binder and a water-based silicon resin, wherein said water-based silicon resin is uncured.

2. A method of constructing a textile sleeve for routing and protecting elongate members, comprising:
   interlacing yarn to form an elongate wall having opposite side edges;
   applying a liquid coating having an acrylic binder and a water-based silicon resin to the yarn;
   heating the liquid coating to drive off water from the yarn without curing the silicon resin and without heat-setting the yarn;
   wrapping the elongate wall into a curled tubular configuration extending along a central longitudinal axis and bringing the opposite side edges into overlapping relation with one another; and
   heat-setting the yarn at a temperature between about 200-225° C. to maintain the wall in a self-wrapping tubular configuration without curing the silicon resin.

\* \* \* \* \*